(12) United States Patent
Rakich et al.

(10) Patent No.: US 11,101,616 B2
(45) Date of Patent: Aug. 24, 2021

(54) BRILLOUIN LASER

(71) Applicant: Yale University, New Haven, CT (US)

(72) Inventors: Peter Rakich, New Haven, CT (US); Nils Thomas Otterstrom, New Haven, CT (US); Eric Andrew Kittlaus, New Haven, CT (US); Ryan Orson Behunin, Flagstaff, AZ (US); Zheng Barton Wang, Austin, TX (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 15/977,500

(22) Filed: May 11, 2018

(65) Prior Publication Data
US 2018/0331490 A1    Nov. 15, 2018

Related U.S. Application Data

(60) Provisional application No. 62/504,868, filed on May 11, 2017.

(51) Int. Cl.
*H01S 3/117* (2006.01)
*H01S 3/30* (2006.01)
(Continued)

(52) U.S. Cl.
CPC ............... *H01S 3/30* (2013.01); *H01S 3/063* (2013.01); *H01S 3/0632* (2013.01);
(Continued)

(58) Field of Classification Search
CPC ........ H01S 3/30; H01S 3/0632; H01S 3/1068; H01S 3/063; H01S 3/08045;
(Continued)

(56) References Cited

U.S. PATENT DOCUMENTS 8,600,200 B1 * 12/2013 Rakich .................... G02F 1/125
    385/1
9,268,092 B1 * 2/2016 Jarecki, Jr. ................ G02F 1/11
    (Continued)

FOREIGN PATENT DOCUMENTS

WO    WO-8606886 A1 * 11/1986 ............. H01S 3/302

OTHER PUBLICATIONS

Kittlaus at al. "On-chip inter-modal Brillouin scattering" Nature communication, Jul. 7, 2017, pp. 1-9. (Year: 2017).*
(Continued)

*Primary Examiner* — Tod T Van Roy
*Assistant Examiner* — Delma R Fordé
(74) *Attorney, Agent, or Firm* — Wolf, Greenfield & Sacks, P.C.

(57) ABSTRACT

Techniques for producing a Brillouin laser are provided. According to some aspects, techniques are based on forward Brillouin scattering and a multimode acousto-optic waveguide in which light is scattered between optical modes of the waveguide via the Brillouin scattering. This process may transfer energy from a waveguide mode of pump light to a waveguide mode of Stokes light. This process may be referred to herein as Stimulated Inter-Modal Brillouin Scattering (SIMS). Since SIMS is based on forward Brillouin scattering, laser (Stokes) light may be output in a different direction than back toward the input pump light, and as such there is no need for a circulator or other non-reciprocal device to protect the pump light as in conventional devices.

20 Claims, 11 Drawing Sheets

(51) Int. Cl.
   *H01S 3/106*   (2006.01)
   *H01S 3/063*   (2006.01)
   *H01S 3/108*   (2006.01)
   H01S 3/094    (2006.01)
   H01S 3/083    (2006.01)
   H01S 3/08     (2006.01)
   H01S 3/07     (2006.01)

(52) U.S. Cl.
   CPC .......... *H01S 3/1068* (2013.01); *H01S 3/1086* (2013.01); *H01S 3/07* (2013.01); *H01S 3/083* (2013.01); *H01S 3/0804* (2013.01); *H01S 3/08045* (2013.01); *H01S 3/094049* (2013.01)

(58) Field of Classification Search
   CPC .......... H01S 3/0804; H01S 3/07; H01S 3/083; H01S 3/094049; H01S 3/108; H01S 3/302; H01S 2301/03; H01S 3/1086
   See application file for complete search history.

(56) References Cited

U.S. PATENT DOCUMENTS

| | | | | |
|---|---|---|---|---|
| 2016/0109736 A1* | 4/2016 | Bahl | .................. | G02F 1/125 385/1 |
| 2018/0375281 A1* | 12/2018 | Puckett | .................. | G02F 1/125 |
| 2020/0050030 A1* | 2/2020 | Kittlaus | .................. | G02B 6/105 |

OTHER PUBLICATIONS

Otterstrom et al. "A silicon Brillouin laser" Physics optics, Sep. 19, 2018, pp. 1-42. (Year: 2018).*
Gundavarapu et al. "Integrated Waveguide Brillouin laser" Sep. 12, 2017, pp. 1-15. (Year: 2017).*
Mirnaziry et al. "Lasing in ring resonator by stimulated Brillouin scattering in the presence of nonlinear loss" Optics Express vol. 28, No. 20, Oct. 2, 2017, pp. 23619-23633. (Year: 2017).*
Sarabalis et al. "Guided acoustic and optical wave in silicon-on-insulator for Brillouin scattering and optomechanics" APL Photonics , 2016, pp. 1-8. (Year: 2016).*
Kittlaus et al. "Large Brillouin amplification in silicon" Physics optics, Oct. 28, 2015, pp. 1-13. (Year: 2015).*
Kittlaus et al. "Large on-chip amplification in silicon via forward stimulated Brillouin scattering" Oct. 15, 2015, pp. 1-5 (Year: 2015).*
Kim et al. "Non-reciprocal Brillouin scattering induced transparency" Physics Optics, Aug. 11, 2014, pp. 1-26. (Year: 2014).*
Zhang et al. "Analysis of acousto-optical interaction based on forward stimulated Brillouin scattering in hybrid photonic-photonic waveguides" Optical Society of America, Jun. 6, 2016, pp. 1-9. (Year: 2016).*
Otterstrom et al. "A silicon Brillouin laser" Research, Jun. 8, 2019, pp. 1-42. (Year: 2019).*
Rakich et al. "Brillouin lasers and amplifiers in silicon photonics" SPIE OPTO, 2018, pp. 1-14 (Year: 2018).*
Kittlaus et al. "Inter-modal Brillouin scattering in an integrated waveguide" IEEE, 2017, pp. 1-12. (Year: 2017).*
Shi et al. "Invited article: Acousto-optics finite-difference frequency-domain algorithm for first-principles simulations of on-chip acousto-optic devices" ALP Photonics 2, 2017, pp. 1-15. (Year: 2017).*
Shin et al. "Tailorable stimulated Brillouin scattering in nanoscales silicon waveguides" Nature communications Jun. 6, 2012, pp. 1-14. (Year: 2012).*
Qiu et al. "Stimulated Brillouin scattering in nanoscale silicon step-index waveguides: a general framework of selection rules and calculating SBS gain", Optics Express, vol. 21, No. 25, Dec. 16, 2013, pp. 31402-31419 (Year: 2013).*
Eric A. Kittlaus et al. "On-chip Inter-modal Brillouin Scattering" Department of Applied Physics, Yale University, pp. 1-22 (Nov. 2016). (Year: 2016).*
Otterstrom et al. "Resonantly enhanced nonreciprocal silicon Brillouin amplifier" vol. 6, No. 9/Sep. 2019, pp. 1117-1123. (Year: 2019).*

* cited by examiner

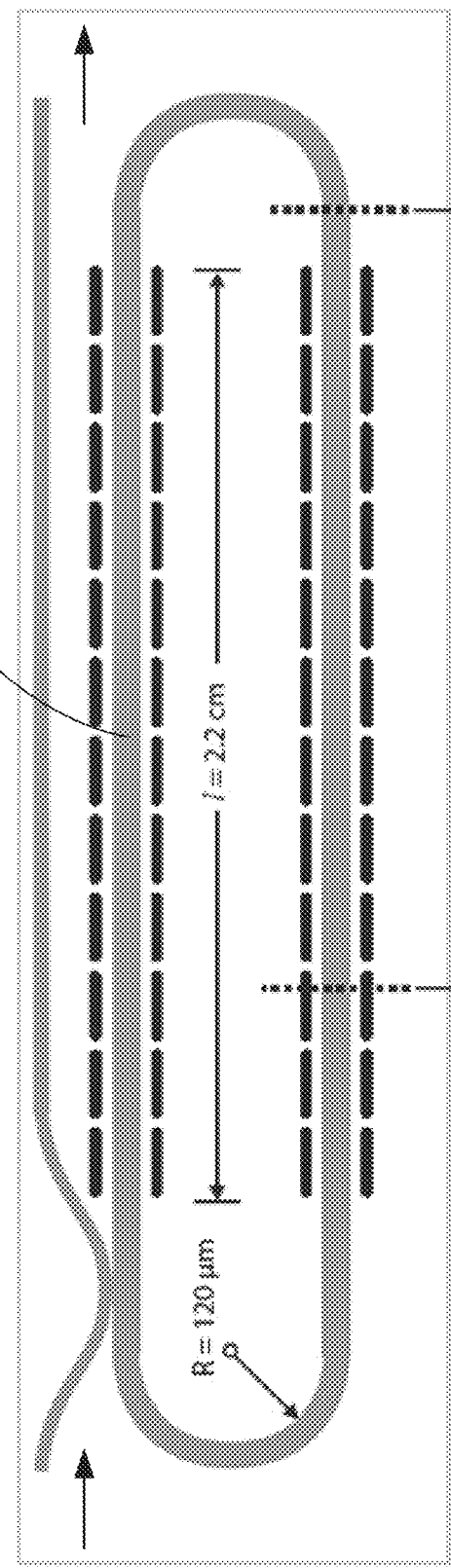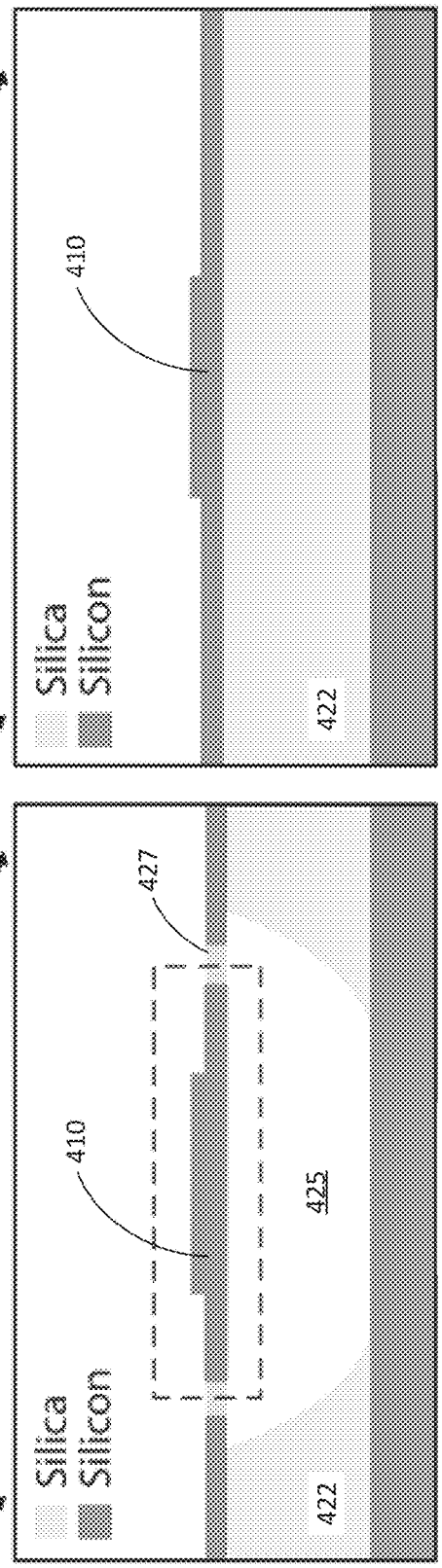

BRILLOUIN LASER

CROSS-REFERENCE TO RELATED APPLICATIONS

The present application claims the benefit under 35 U.S.C. § 119(e) of U.S. Provisional Patent Application No. 62/504,868, filed May 11, 2017, titled "Brillouin Laser in Silicon," which is hereby incorporated by reference in its entirety.

GOVERNMENT FUNDING

This invention was made with government support under grant number DGE1122492 awarded by the National Science Foundation Graduate Research Fellowship and under grant number N00014-16-1-2687 awarded by Office of Naval Research. The government has certain rights in the invention.

BACKGROUND

The ability to shape and control light using silicon has enabled a diverse array of chip-scale applications within the burgeoning field of silicon photonics. The potential for emerging technologies that benefit from highly customized light sources has spurred great interest in silicon-based nonlinear laser oscillators as a way to reshape the spectral and coherence properties of on-chip light. For example, Raman and Kerr nonlinearities have been harnessed to create all-silicon Raman lasers and for demonstrations of long-wavelength Kerr frequency combs in silicon resonators.

One intriguing class of laser oscillators is based on Brillouin interactions, which are produced by the coupling between light and sound. Brillouin interactions are often exceptionally strong, overtaking Kerr and Raman nonlinearities in most transparent media. However, the silicon waveguides that radically enhance Raman and Kerr nonlinearities and are used to produce Raman lasers or Kerr frequency combs produce exceedingly weak Brillouin couplings.

SUMMARY

According to some aspects, a Brillouin laser is provided comprising a closed loop acousto-optical waveguide, an optical input arranged to input pump light into the closed loop acousto-optical waveguide, and an optical output, distinct from the optical input, arranged to output laser light from the closed loop acousto-optical waveguide.

According to some embodiments, the optical input is arranged to input the pump light in a first forward direction, and the optical output is arranged to output the laser light in a second forward direction.

According to some embodiments, the first forward direction and the second forward direction are parallel directions.

According to some embodiments, the Brillouin laser further comprises a directional coupler configured to receive the pump light from the optical input, couple the pump light to the closed loop acousto-optical waveguide, and couple laser light from the closed loop acousto-optical waveguide to the optical output.

According to some embodiments, the closed loop acousto-optical waveguide supports at least two optical modes.

According to some embodiments, the at least two optical modes comprise a symmetric optical mode and an antisymmetric optical mode.

According to some embodiments, the closed loop acousto-optical waveguide comprises a racetrack cavity.

According to some embodiments, the closed loop acousto-optical waveguide comprises a cavity formed on a substrate, and wherein one or more portions of the cavity are suspended over void regions of the substrate.

According to some embodiments, the Brillouin laser further comprises a plurality of tethers mechanically supporting the cavity in the one or more portions.

According to some embodiments, the closed loop acousto-optical waveguide comprises a semiconductor cavity.

According to some embodiments, the closed loop acousto-optical waveguide has a circumference between 100 µm and 10 cm.

According to some embodiments, the closed loop acousto-optical waveguide supports acoustic modes in some, but not all, of a closed loop of the closed loop acousto-optical waveguide.

According to some aspects, a method of producing light using a Brillouin laser is provided, the method comprising providing pump light into a closed loop acousto-optical waveguide, the pump light being input to an optical input of the closed loop acousto-optical waveguide, and producing laser light from the closed loop acousto-optical waveguide, the laser light being output from the closed loop acousto-optical waveguide through an optical output of the closed loop acousto-optical waveguide, distinct from the optical input of the of the closed loop acousto-optical waveguide.

According to some embodiments, the pump light is input in a first forward direction, and the optical output is output in a second forward direction.

According to some embodiments, the first forward direction and the second forward direction are parallel.

According to some embodiments, the pump light and the laser light have different frequencies.

According to some embodiments, a difference between frequencies of the pump light and the laser light is equal to the closed loop acousto-optic waveguide's Brillouin frequency.

According to some embodiments, the method further comprises selecting a frequency of the pump light based at least in part on the closed loop acousto-optic waveguide's Brillouin frequency.

According to some embodiments, the closed loop acousto-optical waveguide supports at least two optical modes.

According to some embodiments, the closed loop acousto-optical waveguide comprises a semiconductor cavity.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 4A-4C depict an illustrative implementation of a Brillouin laser, according to some embodiments;

DETAILED DESCRIPTION

Figure 1:
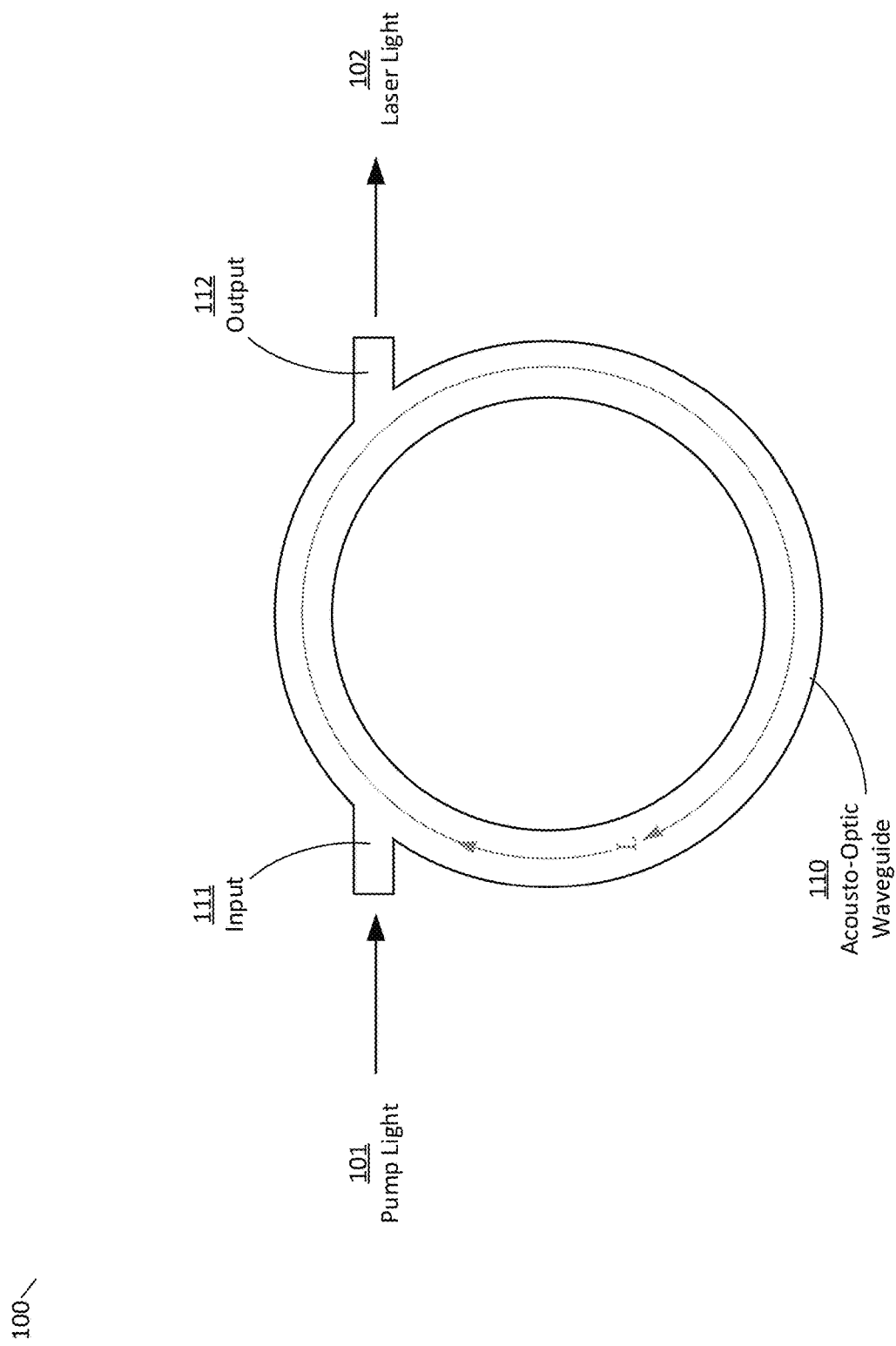
FIG. 1 depicts a schematic of an illustrative Brillouin laser, according to some embodiments.

Conventional Brillouin lasers suffer from a number of deficiencies. For instance, Brillouin lasers that have been demonstrated require extremely fine tuning of waveguide dimensions to properly amplify pump light. These devices are also typically based on backward Stimulated Brillouin Scattering (SBS), which produces amplified light in a direction opposing the pump light. This configuration poses a significant challenge for device integration, since such devices require a high quality circulator or other non-reciprocal device to protect the pump light source from unwanted feedback.

Conventional Brillouin lasers may also suffer from the production of multiple Stokes orders when the pump power is increased. Because such devices rely on the pump and Stokes light propagating in the same spatial mode, when the Stokes wave becomes strong enough it can itself reach the lasing threshold and can thereby produce cascaded energy transfer to successive Stokes orders. The conventional approach is thereby also limited in the manner in which a desired output may be efficiently created from the pump light.

The inventors have recognized and appreciated new techniques for producing a Brillouin laser. These techniques are based on forward Brillouin scattering and a multimode acousto-optic waveguide in which light is scattered between optical modes of the waveguide via the Brillouin scattering. This process leads to energy transfer from a waveguide mode of the pump light to a waveguide mode of the Stokes light. This process may be referred to herein as Stimulated Inter-Modal Brillouin Scattering (SIMS). Since SIMS is based on forward Brillouin scattering, laser (Stokes) light may be output in a different direction than back toward the input pump light, and as such there is no need for a circulator or other non-reciprocal device to protect the pump light as in conventional devices.

According to some embodiments, energy transfer between modes of a Brillouin laser based on SIMS may be tunable, allowing precise control over Stokes light produced within the waveguide. For instance, the power threshold required for a Stokes wave to cascade to another Stokes order can be altered as desired. In some cases, cascading can be completely suppressed by engineering the modes of the waveguide such that higher order Stokes waves are not supported by any mode of the waveguide. As such, energy may be transferred from the pump light to Stokes light within the waveguide without inadvertently creating energy transfer to successive Stokes orders as in conventional devices based on SBS.

According to some embodiments, a Brillouin laser based on SIMS may be implemented on-chip. For instance, a Brillouin laser comprising an on-chip silicon waveguide may be fabricated in some embodiments. An on-chip approach may facilitate a Brillouin laser that is both small and monolithic, and that may be easily configured using standard silicon fabrication techniques to engineer the modes of the waveguide by fabricating the waveguide with particular dimensions.

Following below are more detailed descriptions of various concepts related to, and embodiments of, techniques for producing a Brillouin laser. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts a schematic of an illustrative Brillouin laser, according to some embodiments. Brillouin laser 100 comprises an acousto-optic waveguide 110 that has an input 111 and an output 112. In operation, pump light 101 may be supplied to the input 111 and laser (Stokes) light 102 is output from the output 112. The acousto-optic waveguide 110 has a circumference L.

As used herein, an "acousto-optic waveguide" refers to a waveguide that supports at least one optical mode and at least one acoustic (phonon) mode, although according to some embodiments the at least one acoustic mode need not be supported around the entire loop of the waveguide. For instance, the acousto-optic waveguide may support one or more optical modes around its circumference whilst supporting one or more acoustic modes around part, but not all, of the circumference. Since, as will be described below, the acoustic modes of the waveguide mediate energy transfer between optical modes of the waveguide, it is not a requirement that such energy transfer occurs in all parts of the waveguide, and as a result, in some cases only portions of the waveguide may support one or more acoustic modes.

In Brillouin laser 100, optical self-oscillation requires optical feedback and sufficient optical gain to compensate for round-trip optical loss. Optical gain in the laser 100 is supplied by stimulated Brillouin scattering within the waveguide 110, which is a phase-matched nonlinear process that produces stimulated optical spatial gain for the Stokes wave. Thus, optical self-oscillation ensues within the waveguide 110 when the Stokes spatial mode reaches a lossless state, a condition that occurs when round-trip optical gain balances round-trip optical loss. To produce the optical gain, energy is transferred between optical modes of the waveguide, driven by the pump light 101 and by Brillouin scattering (photon-phonon scattering) processes within the waveguide. As a result, it is important that the waveguide 110 supports at least one acoustic mode. Optical gain may be output from the waveguide as laser (Stokes) light 102.

According to some embodiments, acousto-optic waveguide 110 may be fabricated from any suitable material or combination of materials so long as the waveguide supports multiple optical modes and at least one acoustic mode as described above. It will be appreciated that numerous techniques for fabricating a waveguide structure may be employed, although in particular crystal and/or crystalline materials may be particularly suitable since both light and acoustic phonons may propagate through such a structure. Illustrative materials that may be suitable for fabrication of the acousto-optic waveguide 100 may include silicon, AlGaAs, AlN, $Si_3N_4$, Ge, $SiO_2$ (silica glass), doped silica, $CaF_2$, chalcogenides, or combinations thereof.

According to some embodiments, acousto-optic waveguide 110 may be configured to support at least two optical modes, and in particular may be configured to support at least two transverse optical modes. As discussed above, a Brillouin laser as described herein may transfer energy from a first mode (e.g., a first transverse optical mode) to a second mode (e.g., a second transverse optical mode) of the waveguide via Stokes processes. Such energy transfer may occur in either direction between transverse optical modes of the waveguide. For instance, a waveguide supporting three transverse optical modes may transfer energy from any one of these modes to any other one of these modes (e.g., from first to second, from first to third, from second to first, from second to third, from third to first, or from third to second).

In some embodiments, acousto-optic waveguide 110 may be configured to support at least two optical modes that include a symmetric optical mode and an antisymmetric optical mode. In operation, pump light may initiate a transfer of energy from a first mode (e.g., the antisymmetric optical mode) to a second mode (e.g., the symmetric optical mode) of the waveguide via Stokes processes.

Irrespective of the particular form of the optical modes of the acousto-optic waveguide 110, the waveguide and pump light may meet certain criteria for optical amplification to occur, as described below.

In the case that a first transverse mode and a second transverse mode of the acousto-optic waveguide 110 have different propagation constants, $k_1(\omega)$ and $k_2(\omega)$, respectively, the resonance conditions, $k_1(\omega)L=2\pi m$ and $k_2(\omega)L=2\pi n$, where L is the circumference of the acousto-optic waveguide 110, produce a distinct set of resonant frequencies $\omega_1^m$ and $\omega_2^n$. In the following description, subscripts of 1 and 2 will be used to denote the first transverse mode and the second transverse mode, respectively, and superscripts m and n are used for the modes' resonance indices, respectively.

Through inter-modal Brillouin scattering, a pump wave $\omega_p$ traveling in the second transverse mode of the acousto-optic waveguide 110 may produce amplification of the Stokes wave $\omega_s$ propagating in the first transverse mode of the acousto-optic waveguide 110. According to some embodiments, this may occur when the following energy conservation and phase matching conditions are satisfied:

$$\omega_p = \omega_s + \Omega_b$$

$$k_2(\omega_p) = k_1(\omega_s) + q(\Omega_b)$$

Here, $q(\Omega)$ is the acoustic dispersion relation and $\Omega_b$ is the Brillouin frequency of the acousto-optic waveguide 110, which is set by the physical dimensions and shape of the waveguide. Together these conditions require:

$$k_2(\omega_p) = k_1(\omega_p - \Omega_b) + q(\Omega_b) \quad \text{(Eqn. 1)}$$

Figure 2B:
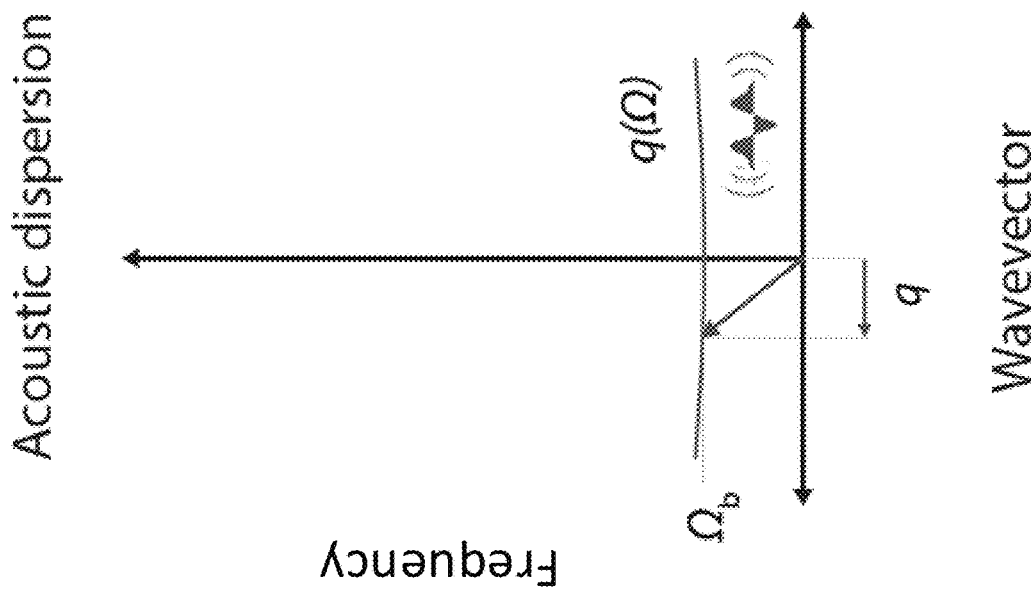
FIGS. 2A-2B depict requirements for phase matching and energy conservation in an acousto-optic waveguide, according to some embodiments.
Figure 2A:
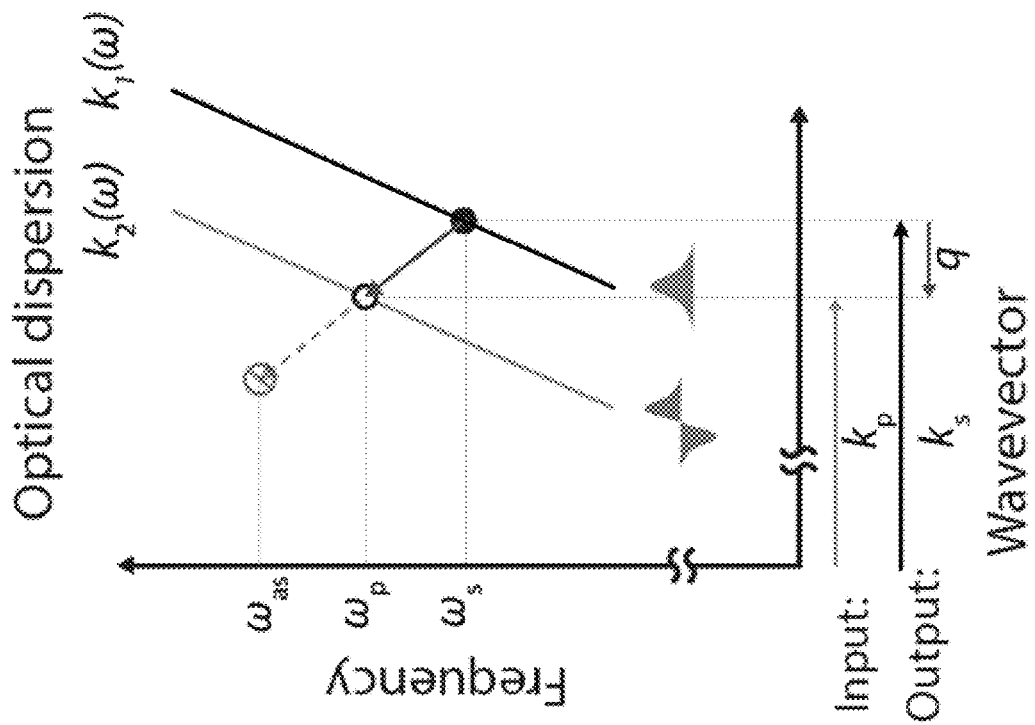

These requirements for phase matching and energy conservation are represented by FIGS. 2A and 2B. Phonons that satisfy the condition of Eqn. 1 lie on the acoustic dispersion curve, $q(\Omega)$ shown in FIG. 2B and connect the initial (open circle) and final (solid circle) optical states identified on the optical dispersion curve of FIG. 2A. From this diagram, we see that a backward-propagating phonon mediates Stokes scattering between pump and Stokes photons propagating in the second transverse and first transverse modes, respectively. By contrast, the anti-Stokes process is mediated by a forward propagating phonon. Since distinct phonon wavevectors mediate Stokes and anti-Stokes processes, these interactions are decoupled, permitting single-sideband amplification. Laser oscillation of the first transverse cavity mode ($\omega_1^m$) occurs when Brillouin gain matches the round-trip loss, producing coherent laser emission at the Stokes frequency ($\omega_s = \omega_1^m$).

According to some embodiments, the above-described lasing requirements may be met by inputting pump light of power $P_p$ into the acousto-optic waveguide 110 through input 111 as shown in FIG. 1. As the input pump wave 101 is tuned to $\omega_2^n$, pump light resonantly circulates in the $n^{th}$ second transverse cavity mode. When this pump power exceeds a threshold power ($P_p > P_{th}$), the Stokes field builds from thermal noise to yield appreciable line-narrowing and coherent Stokes emission at a frequency $\omega_s = \omega_p - \Omega_b$. This Stokes light may be output from the acousto-optic waveguide 110 through output 112. As a result of the above-described process, the input pump light 101 may produce laser light output 102.

According to some embodiments, the first transverse optical mode of the acousto-optic waveguide 110 may be a symmetric optical mode, and the second transverse optical mode of the acousto-optic waveguide 110 may be an anti-symmetric optical mode. In the discussion that follows, the first transverse optical mode of the acousto-optic waveguide is presumed to be a symmetric optical mode and the second transverse optical mode of the acousto-optic waveguide is presumed to be an antisymmetric optical mode. This discussion should not be viewed as limiting, however, as the techniques described herein are not limited to energy transfer between these particular types of transverse optical modes. As discussed above, a Brillouin laser as described herein may transfer energy from any first optical mode to any second optical mode of the waveguide via Stokes processes. As a result, it will be appreciated that the particular illustrative transverse optical modes described below are provided merely as one example.

According to some embodiments, the acousto-optic waveguide 110 may include one or more components to couple the pump light to the waveguide and/or to couple the Stokes light from the waveguide to output 112. Generally, such components may allow the Stokes light to couple to the output 112 without substantially coupling the pump light within the waveguide to the output. In some embodiments, the acousto-optic waveguide may include a directional coupler configured to couple strongly to one mode of the waveguide (e.g., the second transverse mode of the waveguide) and to couple weakly to another mode of the waveguide (e.g., the first transverse mode of the waveguide).

According to some embodiments, the acousto-optic waveguide 110 may comprise any one or more semiconductor materials and/or any other materials capable of supporting acoustic phonon modes. While the waveguide is not limited to any particular material(s) or arrangements of said material(s), it will be appreciated that there may be advantages to fabricating the waveguide from commonly-used semiconductor materials used in on-chip fabrication such as, but not limited to, silicon.

Figure 3A:
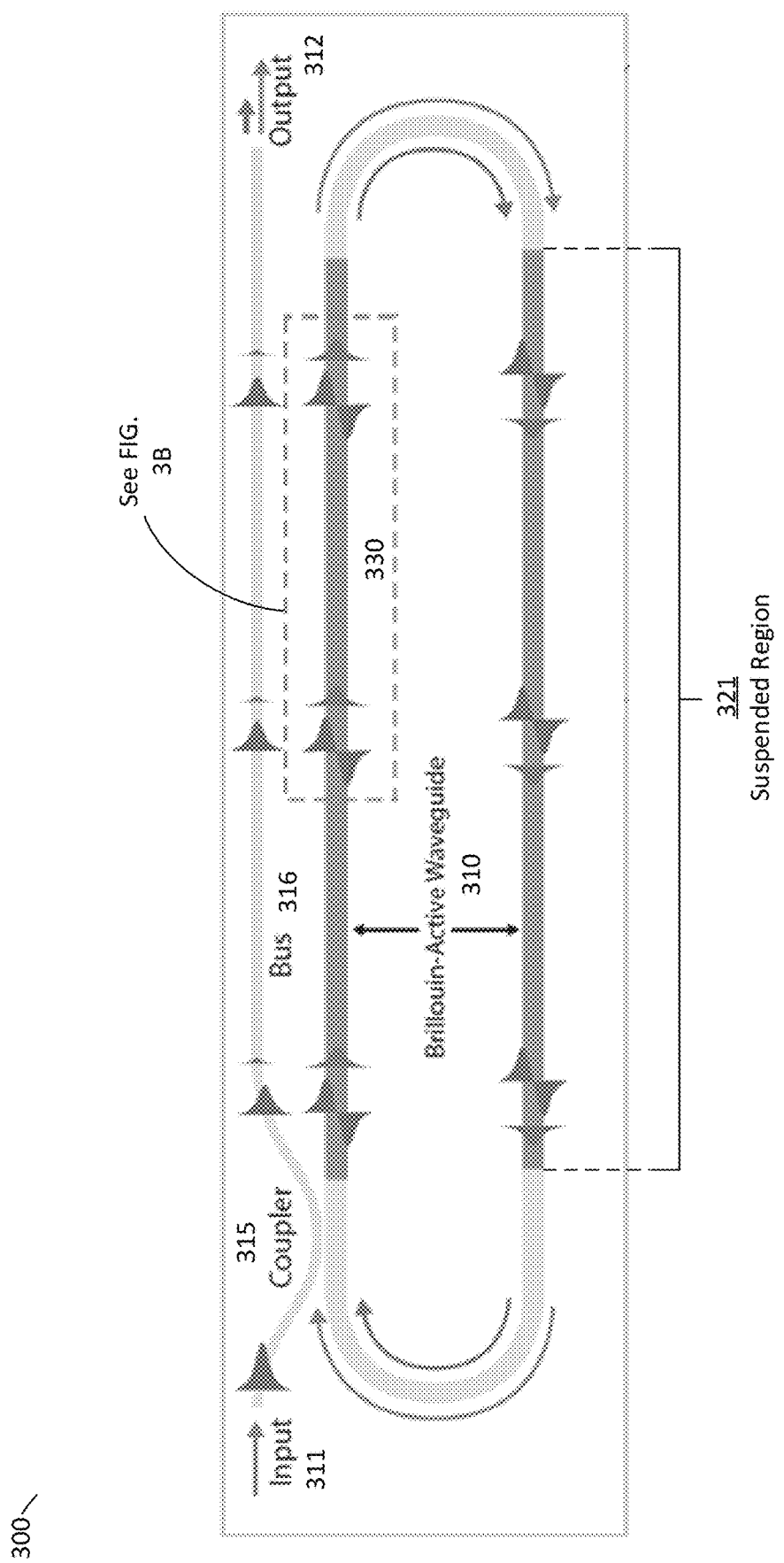
FIG. 3A is a schematic of an illustrative Brillouin laser comprising a racetrack cavity, according to some embodiments.

FIG. 3A is a schematic of an illustrative Brillouin laser comprising a racetrack cavity, according to some embodiments. In the example of FIG. 3A, Brillouin laser 300 comprises racetrack cavity 310, to which input pump light is provided via input 311 and coupler 315. The coupler 315 also couples Stokes light produced in the cavity to an output 312. Racetrack cavity 310 is an example of acousto-optic waveguide 110 that is arranged as a racetrack shape and that includes a coupler for receiving pump light and outputting laser (Stokes) light, as discussed above. In the example of FIG. 3A, the racetrack cavity 310 is a ridge waveguide.

In the example of FIG. 3A, the coupler 315 is configured to be a directional coupler that couples strongly to the antisymmetric mode of the waveguide 310 and weakly to the symmetric mode of the waveguide 310.

In the example of FIG. 3A, symmetric and antisymmetric modes of light are illustrated at various points along the input, bus, output and waveguide by single peak and double-peak waveforms, respectively. For instance, the input pump light 311 is coupled via coupler 315 to the depicted antisymmetric mode of the waveguide 310. Within the waveguide, energy is transferred from the antisymmetric mode into the symmetric mode, as mediated by acoustic phonons in the waveguide. The resulting Stokes light is output from the waveguide via coupler 315 into the bus 316. The Stokes light entering the bus from the symmetric mode of the waveguide is represented in FIG. 3A by the smaller, secondary waveforms and by the smaller arrow in output 312. It will be appreciated that the input and bus in the example of FIG. 3A may be waveguides having any number of modes and that the depiction of multiple waveforms in the figure is provided merely to illustrate the propagation of the light through the system. In some embodiments, the input 311 and/or bus 316 comprise single-mode waveguides.

In the example of FIG. 3A, the waveguide 310 includes two regions in which the waveguide is suspended. These regions, one of which is labeled as suspended region 321, are shaded dark grey and are located along the straight portions of the racetrack waveguide. In some embodiments, suspended sections of a waveguide may be beneficial to tightly confine both light and sound, and to thereby enable a sufficiently strong Brillouin coupling that mediates the transfer of energy between modes of the waveguide.

Figure 3B:
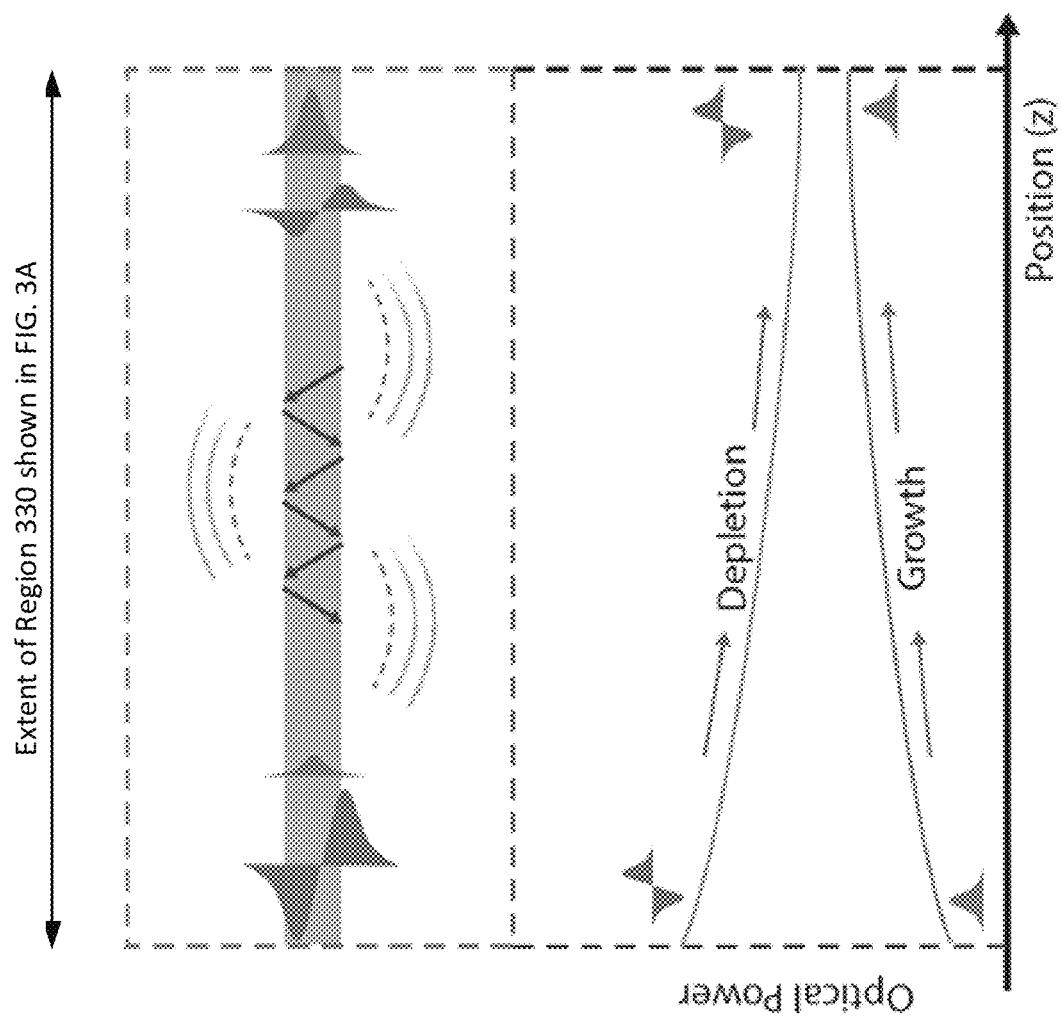
FIG. 3B depicts transfer of energy between modes of the illustrative waveguide of FIG. 3A, according to some embodiments.

The transfer of energy from the antisymmetric mode to the symmetric mode of the illustrative waveguide 310 in region 330 is depicted in FIG. 3B. In FIG. 3B, the physical extent of the region 330 is shown along the horizontal axis (labeled "position(z)"), and the relative optical power of the antisymmetric and symmetric modes is shown in the vertical axis. The upper portion of FIG. 3B conceptually depicts the acoustic phonon mediated transfer of energy from the antisymmetric mode (shown with a comparatively high amplitude double peak waveform on the left of the figure) to the symmetric mode (shown with a comparatively high amplitude single peak waveform on the right of the figure).

Figure 3C:
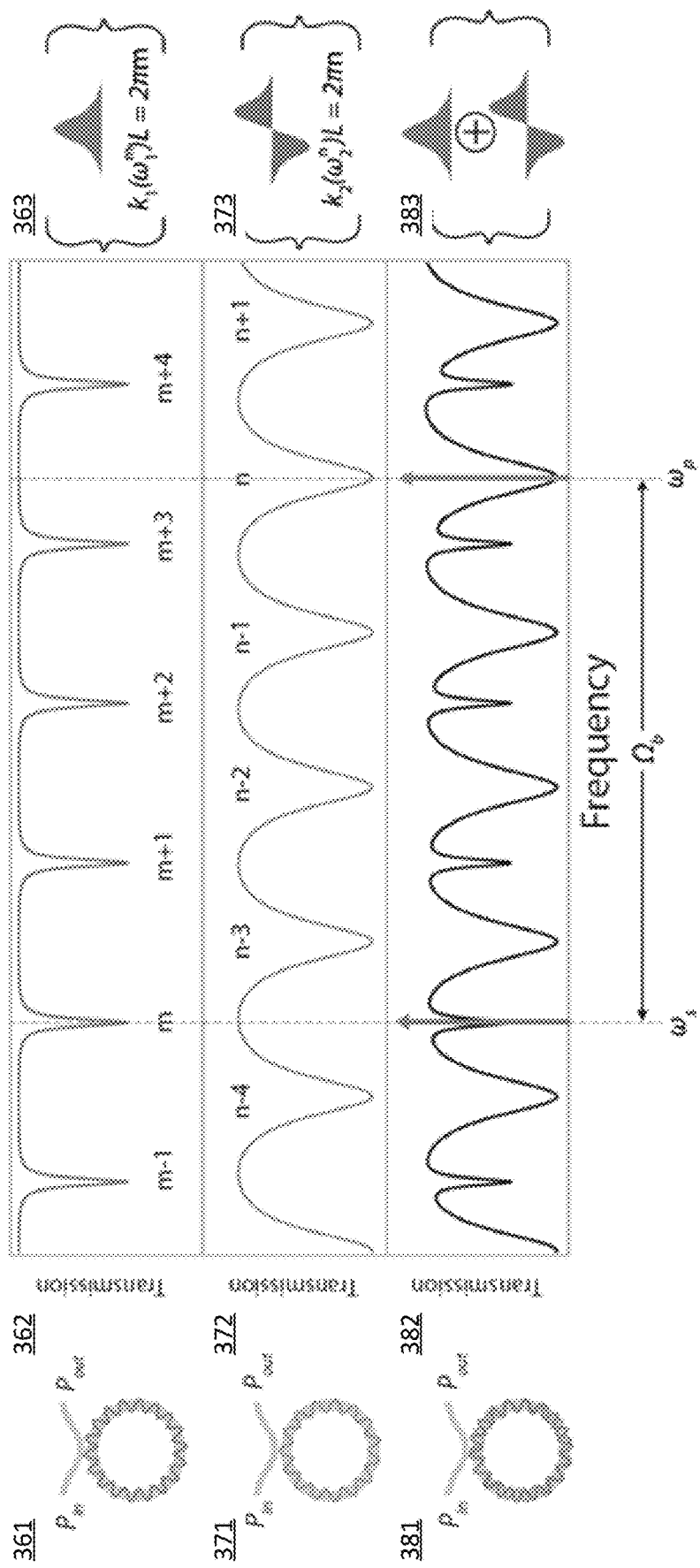
FIG. 3C depicts transmission spectra of symmetric and anti symmetric modes of the illustrative waveguide of FIG. 3A, according to some embodiments.

FIG. 3C depicts transmission spectra of symmetric and antisymmetric modes of the illustrative waveguide of FIG. 3A, according to some embodiments. In FIG. 3C, elements 361-363 relate to the symmetric mode, 371-373 relate to the antisymmetric mode, and 381-383 relate to the combined modes of the waveguide, as discussed below.

In the example of FIG. 3C, plot 362 depicts the transmission spectrum of the symmetric mode with cavity resonances denoted by the letter m, whereas plot 372 depicts the transmission spectrum of the antisymmetric mode with cavity resonances dented by the letter n. As shown in FIG. 3C, energy transfer from the antisymmetric mode to the symmetric mode may be achieved when $\omega_p$ (the pump light frequency) is selected such that $\omega_p$ corresponds to a resonance of the symmetric mode and there is a corresponding frequency $\omega_s = \omega_p - \Omega_b$ that is a resonance of the antisymmetric mode. This relationship between $\omega_p$ and $\omega_s$ is depicted in FIG. 3C by the two vertical dotted lines.

As may be seen in FIG. 3C, lasing behavior is produced for particular frequencies of the pump light $\omega_p$. In some cases, the free spectral ranges (FSRs) of the two optical modes of the cavity may be different such that there are numerous such frequencies $\omega_p$ that produce lasing behavior.

While acousto-optic waveguide 110 may be fabricated in any of numerous ways, FIGS. 4A-4C depict one illustrative implementation of the Brillouin laser 100, according to some embodiments. In the example of FIGS. 4A-4C, an acousto-optic waveguide 400 is formed as a racetrack cavity 410 from silicon on a silica substrate 422. Along straight regions of the racetrack, the silicon is suspended above void regions (of which void region 425 is one example). According to some embodiments, the Brillouin laser 400 may be fabricated from a single-crystal silicon-on-insulator (SOI) wafer.

In the example of FIGS. 4A-4C, a plurality of tethers (of which tether 427 is one example) mechanically support the racetrack cavity 410 on either side of the suspended regions. The array of tethers are identified in the figure by the solid black lines. According to some embodiments, presence of the void regions beneath the racetrack cavity 410 may have a negligible impact on the guidance of optical modes of the cavity, yet may enable guidance of a phonon mode that mediates efficient Brillouin coupling between the optical modes of the cavity.

As discussed above, lasing behavior may be produced only for particular frequencies of the pump light $\omega_p$ that meet the energy conservation and phase-matching conditions of Eqn. 1. In the illustrative device of FIGS. 4A-4C, the racetrack has a circumference of 4.576 cm and exhibits cavity free spectral ranges (FSRs) of 1.614 GHz and 1.570 GHz for the symmetric and antisymmetric optical modes of the cavity, respectively. For this device, the resonance frequency conditions are satisfied by symmetric and antisymmetric cavity mode pairs that occur every 0.40 nm across the C-band (from 1530-1565 nm), corresponding to an approximate frequency difference between pairs of around 50 GHz. According to some embodiments, the Brillouin gain in the Brillouin laser 400 of FIGS. 4A-4C may be substantially larger than for conventional Brillouin lasers. For instance, the gain may be on the order of 400 $W^{-1}$ $m^{-1}$.

Figure 5:
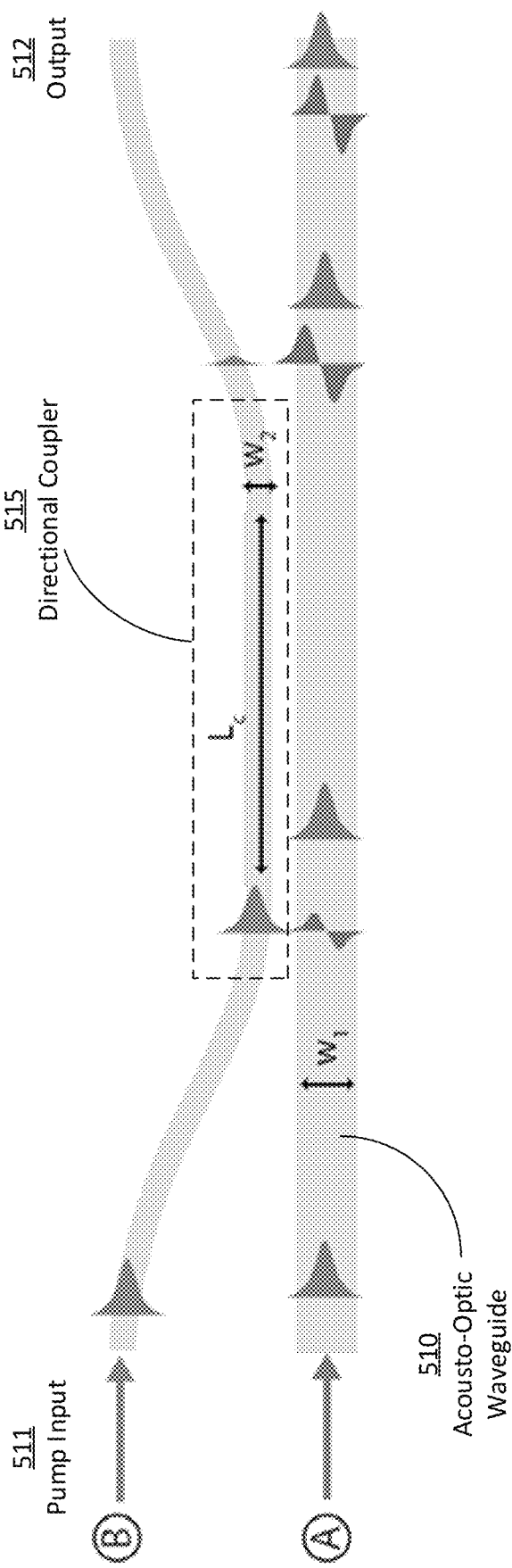
FIG. 5 depicts an illustrative directional coupler, according to some embodiments.

FIG. 5 depicts an illustrative directional coupler, according to some embodiments, that may be configured to couple light as an input to, and an output from, an acousto-optic waveguide, such as waveguide 100 shown in FIG. 1, waveguide 300 shown in FIG. 3A, and/or waveguide 400 shown in FIG. 4A. In the example of FIG. 5, pump light 511 is supplied at a port B, and light in both symmetric and antisymmetric modes propagates through the acousto-optic waveguide 510 (of which only a portion is depicted for clarity).

In the example of FIG. 5, directional coupler 515 (which may also be referred to as a mode multiplexer coupler) is configured to transfer most, or all, of the pump light into the antisymmetric mode of the acousto-optic waveguide 510, whilst light propagating in the symmetric mode of the acousto-optic waveguide 510 remains in that mode. In some embodiments, the directional coupler 515 may transfer light into and/or out of the acousto-optic waveguide 510 via a phase-matched coupling.

In some embodiments, the directional coupler 515 may couple to the symmetric mode of the waveguide, at least to some extent. In some cases, this coupling may be due to crosstalk between the coupler's coupling to the symmetric and antisymmetric modes of the waveguide. Irrespective of how the directional coupler 515 is coupled to the symmetric mode of the waveguide, as a result light propagating in the symmetric mode of the acousto-optic waveguide 510 may be transferred into the coupler to output 512. Thus, Stokes (laser) light propagating in the waveguide may be output from the waveguide to output 512.

According to some embodiments, directional coupler 515 may comprise, or may be comprised of, silicon. In some implementations, the directional coupler 515 may be a ridge waveguide (e.g., of the same cross-sectional shape as the ridge waveguide shown in the example of FIGS. 4A-4C). According to some embodiments, a height of the directional coupler 515 is the same as, or approximately the same as, the height of the acousto-optic waveguide 510 to which it is coupled. For instance, the directional coupler 515 may comprise a ridge waveguide of height 215 nm (relative to a 135 nm silicon layer for non-waveguide portions of the chip), and the acousto-optic waveguide 510 may also comprise of a ridge waveguide of height 215 nm (relative to the 135 nm silicon layer). Non-limiting and illustrative dimensions for the directional coupler 515 shown in FIG. 5 may be as follows: $w_1=1.5$ μm; $L_c=32$ μm; $w_2=630$ nm.

Figure 6A:
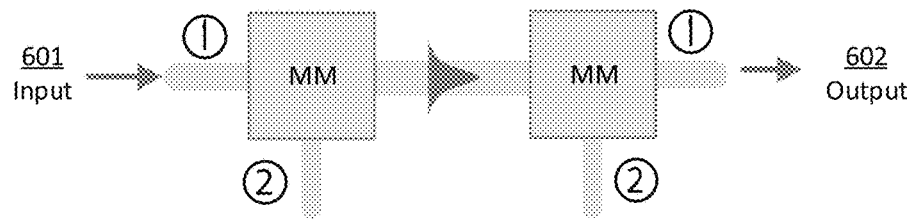
FIGS. 6A-6C depict an alternative Brillouin laser configuration, according to some embodiments.
Figure 6B:
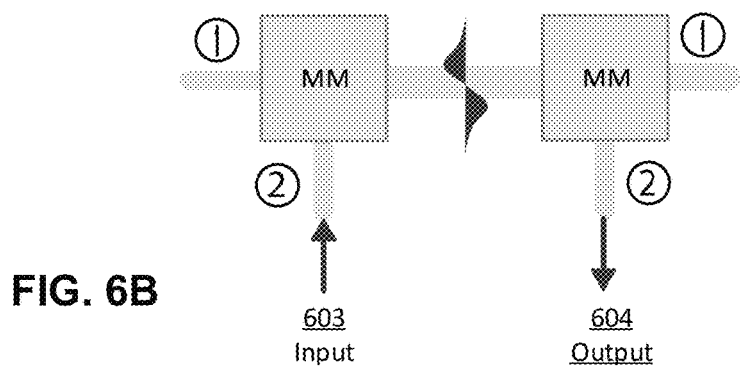
Figure 6C:
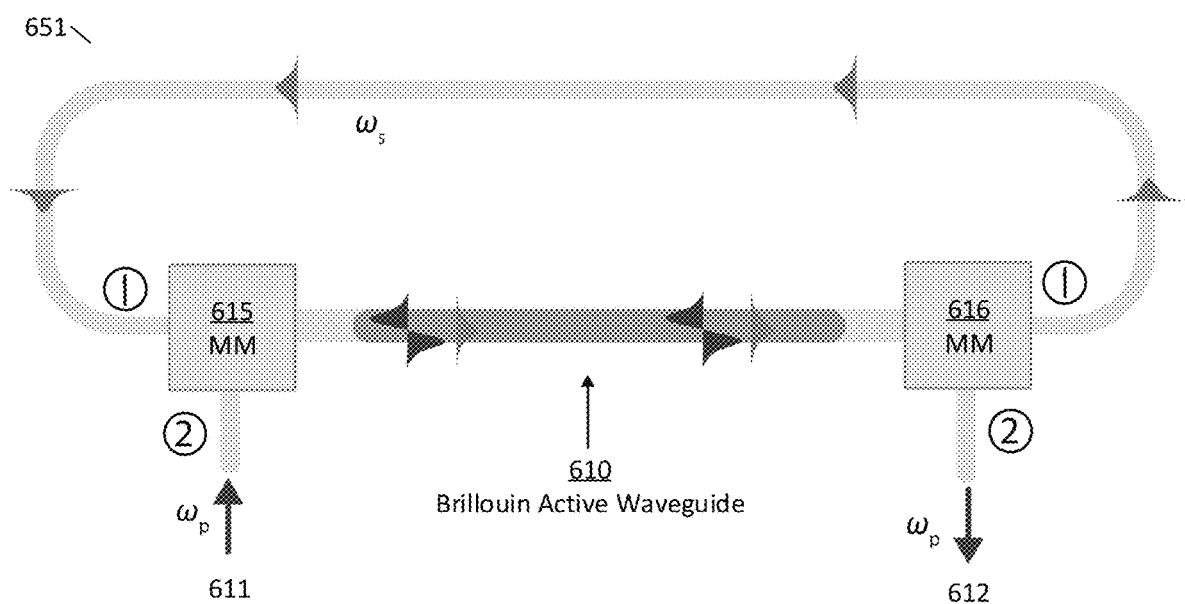

FIGS. 6A-6C depict an alternative Brillouin laser configuration, according to some embodiments. FIGS. 6A and 6B illustrate the behavior of a mode multiplexer element, labeled "MM" in the figures, and FIG. 6C depicts a Brillouin laser 651.

In illustrative Brillouin laser 651, the pump light does not circulate within waveguide 610. Rather, the input pump light 611 is coupled into a transverse optical mode (hereinafter referred to as transverse mode 2) of the waveguide via a mode multiplexer (labeled "MM" in the figures).

FIGS. 6A and 6B illustrate the basic operation of the mode multiplexer (MM). Light coupled into port 1 of the mode multiplexer is multiplexed into transverse mode 1 of the multimode optical waveguide (FIG. 6A). The light can then be demultiplexed out of port 1 using an identical mode multiplexer. FIG. 6B illustrates the same principles for transverse optical mode 2. Light coupled into port 2 of the mode multiplexer is multiplexed into transverse optical mode 2 and then demultiplexed by an identical mode multiplexer.

In illustrative Brillouin laser 651, the pump light 611 input to mode multiplexer 615 amplifies the Stokes wave as it traverses a Brillouin-active region of the waveguide (that is, a region that supports at least one acoustic phonon mode). The pump light is then output 612 from the waveguide via mode multiplexer 616. In this device, the waveguide is effectively transparent to the pump light, because the pump light passes directly through a portion of the waveguide loop. As such, it is not required in the example of FIGS. 6A-6C that the pump light satisfy the cavity resonance condition.

It will be appreciated that, although the above-described techniques have been described in the context of a Brillouin laser, the techniques may also be directed in other contexts.

Figure 7A:
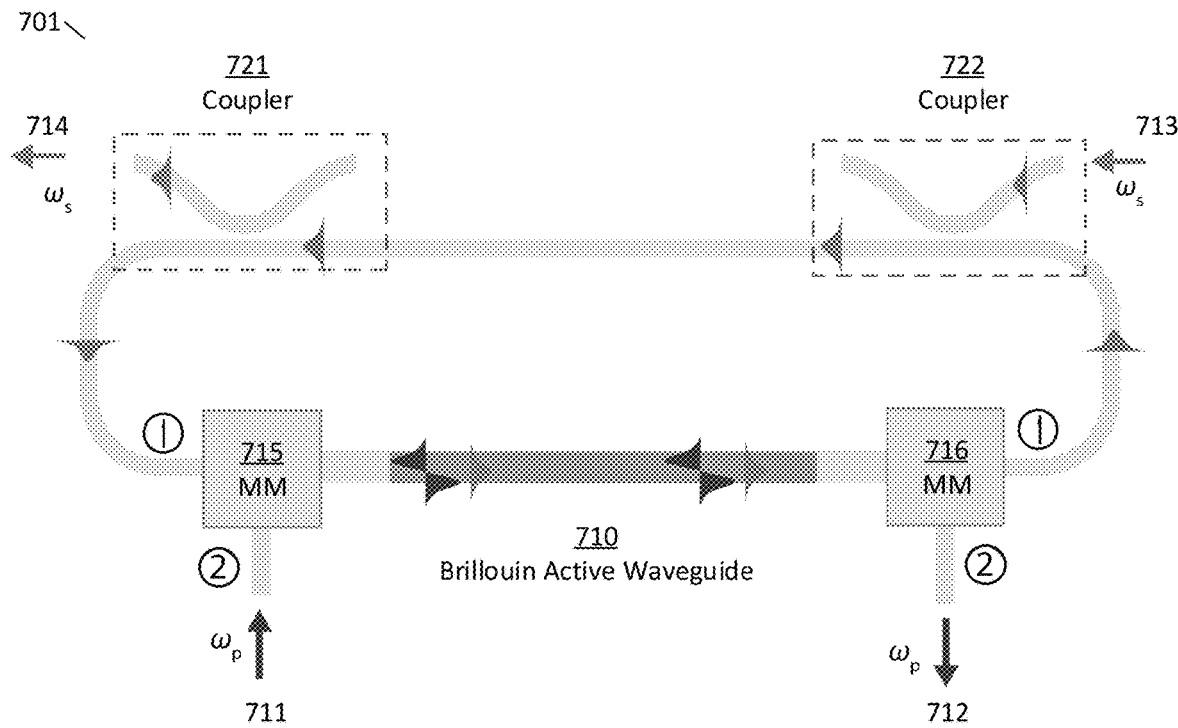
FIGS. 7A and 7B depict illustrative resonant amplifiers, according to some embodiments.

As one example, FIG. 7A depicts an illustrative resonant amplifier, according to some embodiments.

In the example of FIG. 7A, device 701 operates to amplify an input signal wave at the Stokes frequency. In the configuration shown in FIG. 7A, a signal wave 713 (Stokes "seed") of frequency $\omega_s$ is injected via coupler 722 and resonantly amplified through stimulated inter-modal Brillouin scattering, resulting in an amplified signal wave coupled out via coupler 721 and output 714. As with Brillouin laser 651 shown in FIG. 6C, device 701 is non-resonant for the pump wave (transparent to the pump), meaning that pump wave does not circulate around the loop of the waveguide. Rather, the pump light 711, after being multiplexed into transverse mode 2 of the acousto-optic waveguide via mode multiplexer 715, and amplifying the signal wave (at Stokes frequency), is demultiplexed and output 712 from the device through port 2 of the integrated mode multiplexer 716. In this device, the input and output coupler regions for the signal (Stokes) wave 721 and 722 are distinct from the mode multiplexers. These couplers couple signal light into and out of the symmetric mode of the optical waveguide.

Illustrative device 701 may also operate as an inter-modal Brillouin laser (see FIG. 6C) if there is no signal wave input and if the round-trip Brillouin gain is sufficient to balance the round-trip optical loss. If the device operates above threshold and there is an input signal wave present, the system may operate as an injection-locked Brillouin laser.

Figure 7B:
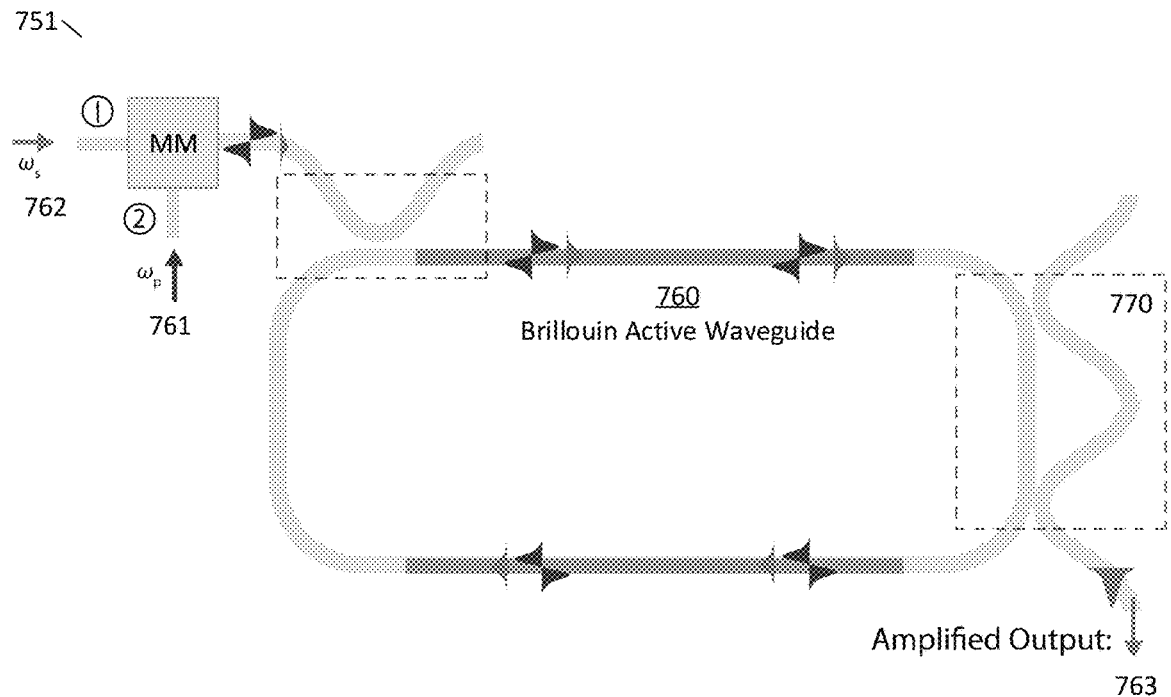

FIG. 7B depicts a second illustrative resonant amplifier, according to some embodiments. In device 751, a multimode racetrack ring resonator operates to amplify input light at the Stokes frequency. An injected signal wave (Stokes "seed") of frequency $\omega_s$ 762 is resonantly amplified through stimulated inter-modal Brillouin scattering, resulting in an amplified signal wave at the output 763. In this configuration, the input signal 762 and pump wave 761 are coupled into the resonator using a mode multiplexer (MM) and a symmetric coupler that couples the signal and pump waves into transverse modes 1 and 2 of the multimode waveguide, respectively. In contrast to the configuration of device 701 shown in FIG. 7A, the pump wave is resonantly enhanced within the racetrack ring cavity. The amplified signal wave is coupled out of the racetrack ring resonator through a mode- or wavelength-selective directional coupler 770. For example, a multimode two point coupler may couple out the signal wave (in transverse mode A) with minimal crosstalk from the pump wave.

Figure 8A:
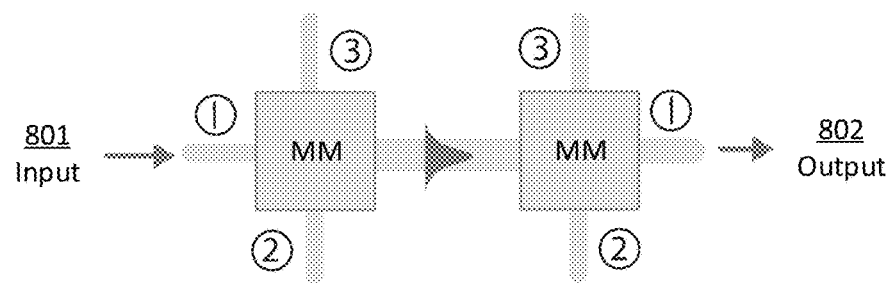
FIGS. 8A-8C illustrate a mode multiplexer, according to some embodiments.
Figure 8B:
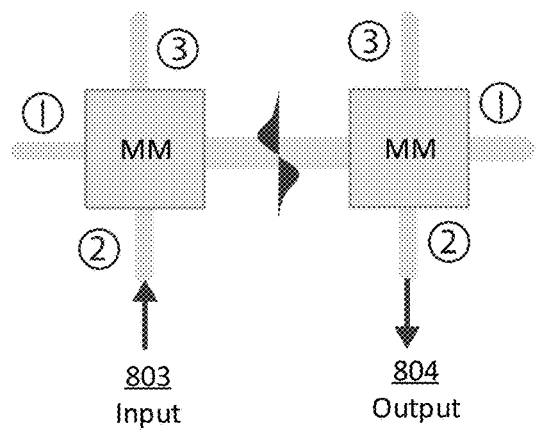
Figure 8C:
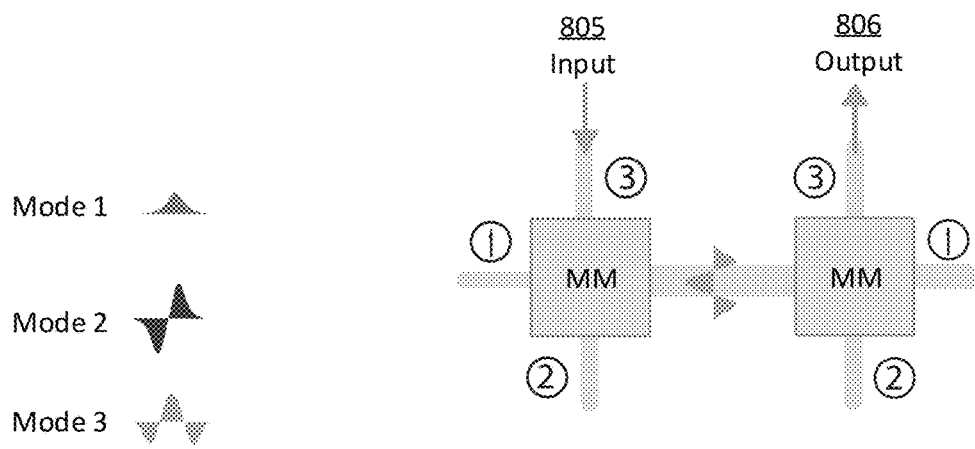

According to some embodiments, a mode multiplexer may be configured to multiplex and/or demultiplex any number of optical transverse modes that are supported by a multimode optical waveguide. For instance, as illustrated in FIGS. 8A-8C, a multiplexer may have 3 inputs, each corresponding to a distinct transverse mode. As a result, light provided to a particular input of the multiplexer couples to a respective optical mode of an optical waveguide, and the respective optical mode of the waveguide may also couple to a particular output of the multiplexer.

Figure 8D:
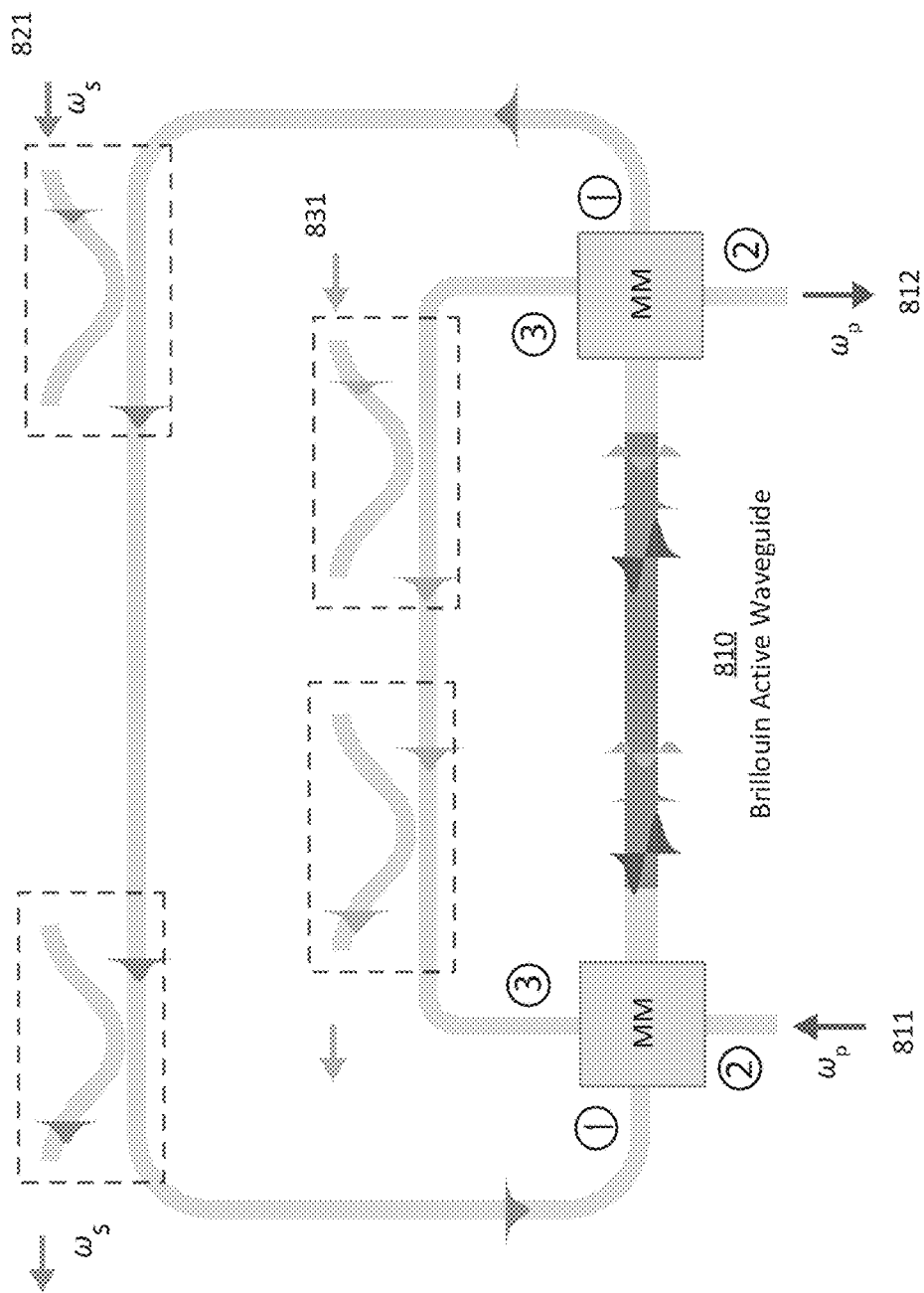
FIG. 8D depicts an illustrative device that may be operated as a resonantly enhanced amplifier or as a multimode optical parametric oscillator, according to some embodiments.

FIG. 8D depicts a device 809 that may be operated as a resonantly enhanced amplifier or as a multimode optical parametric oscillator, according to some embodiments. In the example of FIG. 8D, device 809 may be operated such that a single pump wave simultaneously amplifies two input signal waves 821 and 831 (of frequencies $\omega_s$ and $\omega_{s2}$ respectively), provided there are supported phonon modes within the acousto-optic waveguide that mediate each amplification process (e.g., at least two phonon modes). According to some embodiments, the two signal waves 821 and 831 may resonate within distinct optical cavities as shown that both share an active waveguide region 810. In the example of FIG. 8D, device 809 is non-resonant (transparent) to the pump wave (input 811, output 812), meaning that the pump wave does not circulate within the resonators.

According to some embodiments, device 809 may also be configured to produce parametric amplification in a four-wave mixing process. In this case, input 821 may be a signal wave and input 831 may be an idler wave of frequency $\omega_i$. This process, which relies upon Kerr nonlinearities, requires that both phase matching and energy conservation be conserved. In the illustrative configuration of FIG. 8D:

$$2\omega_p = \omega_s + \omega_i$$

$$2k_2(\omega_p) = k_1(\omega_s) + k_3(\omega_i)$$

where $k_1$, $k_2$ and $k_3$ are propagation constants for the three modes of the waveguide.

This system may operate as an amplifier for either the signal or idler waves if there is an input signal or idler wave, respectively. The system may also operate as an optical parametric oscillator (laser) if no inputs for the signal or idler waves are provided.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A Brillouin laser, comprising:
   an acousto-optical waveguide having a closed loop structure, wherein the acousto-optical waveguide supports at least two different spatial optical modes including a symmetric spatial optical mode and an anti-symmetric spatial optical mode;
   an optical input arranged to input pump light into the acousto-optical waveguide and to couple the pump light to the anti-symmetric spatial optical mode of the acousto-optical waveguide; and
   an optical output, distinct from the optical input, arranged to output laser light from the symmetric spatial optical mode of the acousto-optical waveguide.

2. The Brillouin laser of claim 1,
   wherein the optical input is arranged to input the pump light in a first forward direction, and
   wherein the optical output is arranged to output the laser light in a second forward direction.

3. The Brillouin laser of claim 2, wherein the first forward direction and the second forward direction are parallel directions.

4. The Brillouin laser of claim 1, further comprising a directional coupler configured to receive the pump light from the optical input, couple the pump light to the anti-symmetric spatial optical mode of the acousto-optical waveguide, and couple laser light from the symmetric spatial optical mode of the acousto-optical waveguide to the optical output.

5. The Brillouin laser of claim 1, wherein the at least two spatial optical modes include a first spatial optical mode and a second spatial optical mode that each have a distinct set of resonant frequencies.

6. The Brillouin laser of claim 1, wherein the at least two optical spatial modes are transverse optical spatial modes.

7. The Brillouin laser of claim 1, wherein the acousto-optical waveguide comprises a racetrack cavity.

8. The Brillouin laser of claim 1, wherein the closed loop structure of the acousto-optical waveguide comprises a cavity formed on a substrate, and wherein one or more portions of the cavity are suspended over void regions of the substrate.

9. The Brillouin laser of claim 8, further comprising a plurality of tethers mechanically supporting the cavity in the one or more portions.

10. The Brillouin laser of claim 1, wherein the acousto-optical waveguide comprises a semiconductor cavity.

11. The Brillouin laser of claim 1, wherein the acousto-optical waveguide has a circumference between 100 μm and 10 cm.

12. The Brillouin laser of claim 1, wherein the acousto-optical waveguide supports acoustic modes in some, but not all, of the closed loop structure of the acousto-optical waveguide.

13. A method of producing light using a Brillouin laser, the method comprising:
    providing pump light into an acousto-optical waveguide having a closed loop structure, wherein the acousto-optical waveguide supports at least two different spatial optical modes including a symmetric spatial optical mode and an anti-symmetric spatial optical mode, the pump light being input to an optical input coupled to the anti-symmetric spatial optical mode of the acousto-optical waveguide;

transferring energy from the anti-symmetric spatial optical mode of the acousto-optical waveguide to the symmetric spatial optical mode of the acousto-optical waveguide; and producing laser light from the acousto-optical waveguide, the laser light being output from the acousto-optical waveguide through an optical output of the acousto-optical waveguide coupled to the symmetric spatial optical mode of the acousto-optical waveguide, the optical output being distinct from the optical input of the of the acousto-optical waveguide.

14. The method of claim 13, wherein the pump light is input in a first forward direction, and wherein the optical output is output in a second forward direction.

15. The method of claim 14, wherein the first forward direction and the second forward direction are parallel.

16. The method of claim 13, wherein the pump light and the laser light have different frequencies.

17. The method of claim 16, wherein a difference between frequencies of the pump light and the laser light is equal to the acousto-optic waveguide's Brillouin frequency.

18. The method of claim 13, further comprising selecting a frequency of the pump light based at least in part on the acousto-optic waveguide's Brillouin frequency.

19. The method of claim 13, wherein the anti-symmetric spatial optical mode and the symmetric spatial optical mode have a distinct set of resonant frequencies.

20. The method of claim 13, wherein the acousto-optical waveguide comprises a semiconductor cavity.

\* \* \* \* \*